(12) United States Patent
Newman

(10) Patent No.: US 10,176,202 B1
(45) Date of Patent: Jan. 8, 2019

(54) METHODS AND SYSTEMS FOR CONTENT-BASED IMAGE RETRIEVAL

(71) Applicant: XANADU BIG DATA, LLC, Lexington, MA (US)

(72) Inventor: Rhys Andrew Newman, Perth (AU)

(73) Assignee: XANADU BIG DATA, LLC, Lexington, MA (US)

( * ) Notice: Subject to any disclaimer, the term of this patent is extended or adjusted under 35 U.S.C. 154(b) by 0 days.

(21) Appl. No.: 15/987,868

(22) Filed: May 23, 2018

Related U.S. Application Data

(60) Provisional application No. 62/639,049, filed on Mar. 6, 2018, provisional application No. 62/660,116, filed on Apr. 19, 2018.

(51) Int. Cl.
*G06F 17/30* (2006.01)
*G06K 9/62* (2006.01)
*G06F 15/18* (2006.01)

(52) U.S. Cl.
CPC .... *G06F 17/3028* (2013.01); *G06F 17/30256* (2013.01); *G06K 9/6215* (2013.01); *G06K 9/6247* (2013.01); *G06F 15/18* (2013.01)

(58) Field of Classification Search
CPC combination set(s) only.
See application file for complete search history.

(56) References Cited

U.S. PATENT DOCUMENTS

| | | | |
|---|---|---|---|
| 8,392,842 B1* | 3/2013 | Lorenz | G06F 17/30247 382/103 |
| 2007/0217676 A1* | 9/2007 | Grauman | G06K 9/4671 382/170 |
| 2009/0006337 A1* | 1/2009 | Cheung | G06F 17/30802 |
| 2009/0125487 A1* | 5/2009 | Rossi | G06F 17/30247 |
| 2013/0182895 A1* | 7/2013 | Touzov | G06F 19/321 382/103 |
| 2016/0078057 A1* | 3/2016 | Perez de la Coba | G06F 17/30256 707/772 |

* cited by examiner

*Primary Examiner* — Tsung-Yin Tsai
(74) *Attorney, Agent, or Firm* — Daly, Crowley, Mofford & Durkee

(57) ABSTRACT

The present disclosure discloses a method for retrieval of similar images from a database. For a plurality of input images, each input image is disintegrated into a plurality of image patches of one or more predefined pixel sizes. A representation of each image patch is computed using a dimensional reduction method and distances between the representations of each image patch are compared. Further, the representations of each image patch into addressable hyper-cubes are quantized, wherein an address of a hyper-cube is determined by content of corresponding image patch. Then, each image patch is stored using corresponding address as a key into the database. Later, for a target image patch, a set of similar image patches is retrieved from the database using the key.

21 Claims, 7 Drawing Sheets

Exemplary Tables

| String | Time | Data Reference |
|--------|------|----------------|
| Key1 | 28742834 | ABF878329 |
| Key2 | 28742801 | ABF878329 |
| Key1 | 28742800 | 992BAF879 |

| Data Reference | Data Bytes |
|----------------|------------|
| ABF878329 | 938429479573953579358439583753958 35382 |
| 992BAF879 | 937859435730 0001 |

FIG. 3

METHODS AND SYSTEMS FOR CONTENT-BASED IMAGE RETRIEVAL

CROSS-REFERENCE TO RELATED APPLICATIONS

This application claims the benefit of U.S. Provisional Application No. 62/639,049, filed Mar. 6, 2018 and U.S. Provisional Application No. 62/660,116, filed Apr. 19, 2018. The entire content of that application is hereby incorporated herein by reference.

TECHNICAL FIELD

The present disclosure generally relates to the field of image retrieval, and in particular, relates to methods and systems for content-based retrieval of images using machine learning methods.

BACKGROUND

As is generally known, the medical fraternity maintains records of patient treatments for research and development purposes. Such records usually include details pertaining to tests, reports of those tests, diagnoses, and course of action selected for treatment. Many of such records are images, such as images of affected body parts of the patients indicating a disease or abnormality. Such records of thousands of patients being collected over several decades have led to development of an exhaustive database serving as reference data for doctors or clinicians, for example, while assessing new images for signs of a disease. Therefore, the database often serves as a text book for assistance in treatment and diagnosis of a range of diseases. The doctors may study new images and compare the new images to similar images available in the database.

Similarly, as astronomy has become an immensely data-rich field due to numerous digital sky surveys across a range of wavelengths, techniques to automate the search in huge volumes of data are needed for speeding up research process. However, the astronomical images are commonly noisy with objects of diffuse nature. It has been realized that techniques specific to face this problem are needed. To handle the enormous volume of data, not only of the big number of images but also the size of each image file, it is necessary to summarize the information. For some astronomical objects, assessment of pre-researched records in the database is sufficient for quick and accurate identification. By comparing a new astronomical image to similar images available in the database, it becomes easier for researchers to identify a nature of the new astronomical image.

However as the number of records pertaining to medical data and astronomical data increases in their corresponding databases, handling such a large amount of image data poses a significant challenge. It becomes difficult to implement an architecture that enables archiving of such large number of image data that allows quick retrieval of image data on demand at a low cost. Therefore, there is a need for more scalable and efficient solutions.

SUMMARY

An embodiment of the present disclosure provides a method for retrieval of similar images from a database. For a plurality of input images, each input image is disintegrated into a plurality of image patches of one or more predefined pixel sizes. A representation of each image patch is computed using a dimensional reduction method and distances between the representations of each image patch are compared. Further, the representations of each image patch into addressable hyper-cubes are quantized, wherein an address of a hyper-cube is determined by content of corresponding image patch. Then, each image patch is stored using corresponding address as a key into the database. Later, for a target image patch, a set of similar image patches is retrieved from the database using the key.

In some embodiments, a system is provided for content-based retrieval of images from a database. The system includes a receiving module configured to disintegrate each input image into a plurality of image patches of one or more predefined pixel sizes, for a plurality of input image, a determining module configured to compute a representation of each image patch using a dimensional reduction method, compare distances between the representations of each image patch, quantize the representations of each image patch into addressable hyper-cubes, wherein an address of a hyper-cube is determined by content of corresponding image patch, and store each image patch using corresponding address as a key into the database. The system further includes a retrieving module configured to retrieve a set of similar image patches from the database for a target image patch using the key.

In some embodiments, a non-transitory computer readable medium is provided for storing data in a database. The non-transitory computer readable medium comprise a set of instructions, wherein the set of instructions when executed by a processor causes the processor to disintegrate each input image into a plurality of image patches of one or more predefined pixel sizes, compute a representation of each image patch using a dimensional reduction method, compare distances between the representations of each image patch, quantize the representations of each image patch into addressable hyper-cubes, wherein an address of a hyper-cube is determined by content of corresponding image patch. The set of instructions when executed by a processor further causes the processor to store each image patch using corresponding address as a key into the database, and for a target image patch, retrieve a set of similar image patches from the database using the key.

BRIEF DESCRIPTION OF DRAWINGS

FIG. 3 illustrates a key-value temporal data model for storing images in a database, according to one embodiment of the present disclosure;

DETAILED DESCRIPTION

Figure 1:
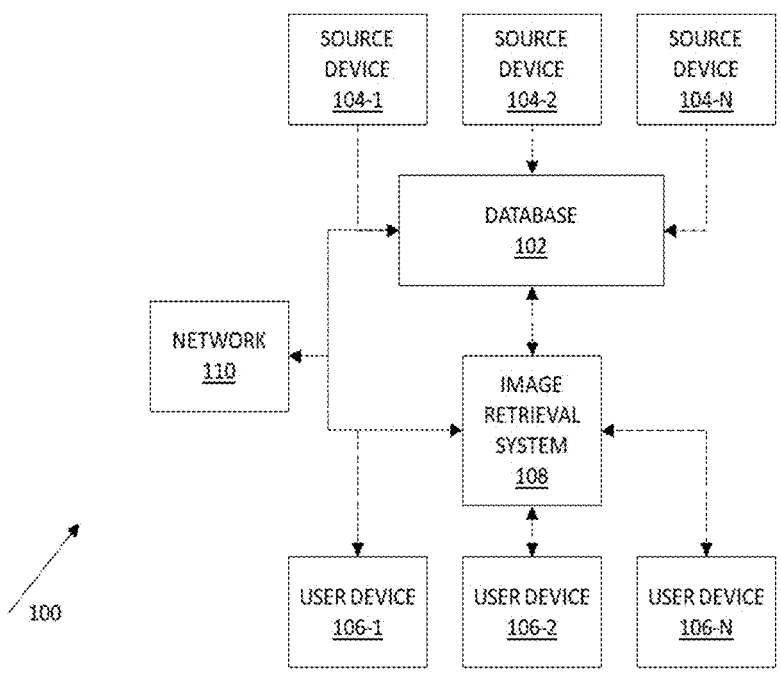
FIG. 1 illustrates an exemplary environment in which various embodiments of the present disclosure can be practiced.

The present disclosure will now be described more fully with reference to the accompanying drawings, in which embodiments of the present disclosure are shown. However, this disclosure should not be construed as limited to the embodiments set forth herein. Rather, these embodiments are provided so that this disclosure will be thorough and complete, and will fully convey the scope of the present disclosure to those skilled in the art. Like numbers refer to like elements throughout.

The present disclosure discloses methods and systems for content-based retrieval of images from a database. The present disclosure is explained in detail in the context of retrieval of images for general applications of a Content Based Image Retrieval (CBIR) system. The general applications include, for example, retrieval of images for diagnoses of a variety of diseases that can be detected by clicking images of affected body parts. There are numerous imaging techniques that are used to highlight small areas, also referred to as lesions, in an otherwise healthy tissue. For example, breast cancer can be detected at an early stage as small shadows on a Mammogram, i.e., an X-Ray of the breast. Also, Positron Emission Tomography (PET) scans highlight small areas of increased metabolic activity that may be used to characterise cancerous growths. Similarly, retinal images may show small bleeds, also referred to as micro-aneurysms, which may be used to indicate an abnormality in an eye or wider metabolic problems, such as type II diabetes.

Other applications include detecting and identifying unknown astronomical objects based on search for similar known objects using the CBIR system. There exist numerous approaches to perform content-based retrieval on a database of astronomical images. One such approach employs image processing to normalize the images, eliminating the effects of orientation and scale, then performing principal component analysis (PCA) to reduce the dimensionality of the data, and finally, doing retrieval using the nearest neighbour algorithm, to find the images that are most similar to a query image. However, using only this standard PCA technique, the large size and number of images is too demanding for many practical uses for current systems.

In one embodiment, an image retrieval system for content-based retrieval of images from a medical database is disclosed. The image retrieval system firstly generates a core index of images in the database. For generating the core index, the image retrieval system receives the images along with corresponding expert-reviewed diagnoses from the database if it is a medical image. Each image is split into a number of small image "patches". The number of patches is generated in such a manner that a smallest possible size of patches is obtained while still ensuring lesions that can indicate disease can still be recognised within the patch. The image retrieval system associates each patch with a corresponding diagnosis tag i.e. "disease" or "no disease". The image retrieval system standardizes the patches while ensuring a balance between patches indicating "Disease" and patches indicating "Non-Disease". This is done by checking that each new patch is sufficiently "novel" from other patches in the database—i.e. in terms of distances, each patch is sufficiently far away from any neighbours so that dense clusters of patches do not swamp and dominate with one type of label. After the standardization, the core index of the images in the database is generated for further application.

Further, the image retrieval system obtains a new image to be assessed for diseases. The new image may hereinafter interchangeably be referred to as target image. Upon obtaining the target image, the image retrieval system disintegrates the target image into a plurality of image patches having a size corresponding to the size of image patches selected for generation of the core index of the images in the database. Upon disintegration, the plurality of patches of the target image is standardized with each other as explained earlier for the images in the database.

Subsequently, for each patch of the target image, the image retrieval system retrieves a set of patches, from the number of patches in the database, which are determined to be "close". In one embodiment, the closeness is with respect to resemblance in appearance of the patches with each other, as determined by expressing patches in a reduced basis (determined in one embodiment by "PCA") and comparing distances by conventional Euclidian measure in this simplified space. Following the retrieval of sets of patches, the image retrieval system retrieves diagnoses corresponding to sets of patches. Based on closeness of the "close" patches from each patch of the target image and corresponding diagnoses, the image retrieval system determines one or more diseases indicated by one or more patches of the target image.

In another embodiment, an image retrieval system for content-based retrieval of images from an astronomical database is disclosed. In one embodiment, an image retrieval system for content-based retrieval of images from a database is disclosed. The image retrieval system firstly generates a core index of images in the database. For generating the core index, the image retrieval system receives the images along with corresponding expert-reviewed labels from the database. Each image is split into a number of small image "patches". After the standardization, the core index of the images in the database is generated for further application in accordance with standard indexed store such as a relational database, key-value or timeline store.

Further, the image retrieval system obtains a new image to be assessed for classification/identification of an astronomical object. The new image may hereinafter interchangeably be referred to as target image. Upon obtaining the target image, the image retrieval system disintegrates the target image into a plurality of image patches having a size corresponding to the size of image patches selected for generation of the core index of the images in the database.

Subsequently, for each patch of the target image, the image retrieval system retrieves a set of patches, from the number of patches in the database, which are determined to be "close". In one embodiment, the closeness is with respect to resemblance in appearance of the patches with each other, as determined by expressing patches in a reduced basis (determined in one embodiment by PCA) and comparing distances by conventional Euclidian measure in this simplified space. Following the retrieval of sets of patches, the image retrieval system retrieves the labels corresponding to sets of patches. Based on the closeness and labels of these "close" patches, the image retrieval system can accurately identify/classify/label an astronomical object supplied in the target image.

The above-mentioned example embodiments, however, can be applicable to other CBIR systems and methods for different type of images and applications, without departing from the scope of the present disclosure. Therefore, the present disclosure offers a comprehensive and effective approach for content-based retrieval of images from the database. Firstly, the image retrieval system processes the images in the database for easy archiving and retrieval. Rather than retrieving all images or data corresponding to a record in the database, the image retrieval system retrieves only those portions or patches of the relevant images that are found to be closer to the target image. This is a significantly more efficient and scalable approach.

Even when are millions or billions of images in the database, the image retrieval system is capable of quickly retrieving the images. This is due to the pre-processing/indexing steps taken as described above where all image patches are placed into a quantised "hyper-cube" in a reduced space (in one embodiment a space defined by PCA analysis) and using this hyper-cube's location (address) as a key in a scalable "timeline key-value" store. With a suitably indexed database storage technology, this implies a constant-time lookup cost irrespective of how large the database is. Further, the image retrieval system ensures storage and retrieval of the images requiring only a basic key-value store. As there are many scalable database systems that offer such a distributed index on commodity hardware, this feature of the present disclosure facilitates implementations with an extremely low cost per image in terms of both time and money. Moreover, the image retrieval system is a fully automated classification and identification module delivering accurate results due to such focused comparison techniques.

The image retrieval system may also use a similarity search method built using a machine learning and a time-line key-value store for handling large amounts of data. The image retrieval system uses dimensional reduction methods (in one embodiment PCA technique) to cluster images together in a way that naturally groups similar images along with the machine learning (ML) model to further improve retrieval speed and accuracy. The image retrieval system can also be used to build a high capacity CBIR store that is particularly suited for use in astronomical imaging applications. For example, the PCA basis with the ML model allows the PCA coordinates to be subtly adjusted to get any patch into the best neighbourhood (i.e. hyper-cube address). The machine learning methods have been used to navigate the space of "similar images" so that any CBIR system based upon it can rank all "close" image patches quickly and accurately.

Apart from providing scalable, fast, and durable storage of valuable image data, particular performance advantages can be exploited to build a range of CBIR supported products. Also, with growing astronomical image data, automatic image retrieval system may prove beneficial. Therefore, the present disclosure offers methods and systems for content-based image retrieval that are comprehensive, effective, accurate, time-intensive, flexible, and cost-effective.

FIG. 1 is an exemplary environment 100 in which various embodiments of the disclosure can be practiced. The environment 100 illustrates a database 102 being populated by data received from a number of source devices 104. The database 102 may be developed to provide storage of large amounts of electronic data where most of the data is in form of images. In one embodiment, the data may relate to medical histories of patients that may include, but is not limited to, documented symptoms, tests performed, test reports, diagnoses, and course of actions opted for treatment of diseases. In another embodiment, the data may relate to images of various astronomical objects such as galaxies, nebulas, and clusters. The galaxies may be classified into various classes such as elliptical galaxies, lenticular galaxies and spiral galaxies.

The database 102 may be a distributed database management system, with data being stored over multiple locations, for example, across countries or states. The data may also be present at one location through multiple computing devices. In one embodiment, the database 102 may include, but is not limited to, a Network Attached Storage (NAS), Storage Area Networks (SANs), and a cloud based storage, such as Internet Area Network (IAN) storage systems. The database 102 may receive the data from the source devices 104.

The source devices 104 may individually be referred to as a source device 104-1, a source device 104-2, . . . , and a source device 104-N. In one embodiment, the source devices 104 may include, but are not limited to, servers of medical facilities and computing devices of clinicians or doctors. For example, the source devices 104 may include, but are not limited to, cell phones, personal digital assistants (PDAs), computers, servers, laptop computers, tablets, Internet appliances, or mainframe computers. In one embodiment, the source devices 104 may be located remotely from the database 102. In alternate embodiment, the source devices 104 may be locally located. Further, the source devices 104 may be authorized to perform a number of transactions or operations in the database 102. Such operations may include, but are not limited to, create, insert, read (query or access), update, and delete. The source devices 104 may write and read data to and from the database 102. In one embodiment, the source devices 104 may be used by one or more admin users for performing operations, such as storage of data and creation of one or more data entries.

In one embodiment, for identification of images purposes, a user may interact with the database 102 through an image retrieval system 108, also referred to as system 108. The user may use a user device 106 for interacting with the system 108 for retrieval of relevant images from the database 102. The user device 106 may include, but is not limited to, a personal computer, a mobile device, a tablet, and a laptop. In FIG. 1, multiple user devices 106, individually referred to as a user device 106-1, a user device 106-2, and a user device 106-N, are shown interacting with the system 108 and in turn, with the database 102. In one embodiment, a source device 104 may operate as a user device 106 as well, without departing from the scope of the present disclosure.

As shown, the database 102, the source devices 104, the user devices 106, and the system 108 are in communication with each other through a network 110. The network 110 may be a wired network, wireless network, a combination of these or any other conventional network, without limiting the scope of the present disclosure. For example, the network 110 may include, but is not limited to, a Local Area Network (LAN), wireless LAN connection, an Internet connection, a point-to-point connection, or other network connection and combinations thereof. The network 110 may be any other type of network that is capable of transmitting or receiving data to/from host computers, storage devices, personal devices, telephones, video/image capturing devices, video/image servers, or any other electronic devices. Further, the network 110 is capable of transmitting/sending data between the mentioned devices. Additionally, the network 110 may be a local, regional, or global communication network, for example, an enterprise telecommunication network, the Internet, a global mobile communication network, or any combination of similar networks. The network 110 may be a combination of an enterprise network (or the Internet) and a cellular network, in which case, suitable systems and methods are employed to seamlessly communicate between the two networks. In such cases, a mobile switching gateway may be utilized to communicate with a computer network gateway to pass data between the two networks. The network 110 may include any software, hardware, or computer applications that can provide a medium to exchange signals or data in any of the formats known in the art, related art, or developed later.

The present disclosure discloses the image retrieval system 108 for content-based retrieval of the images from the database 102 for general applications including medical diagnostic purposes and astronomical object classification purposes.

Figure 2:
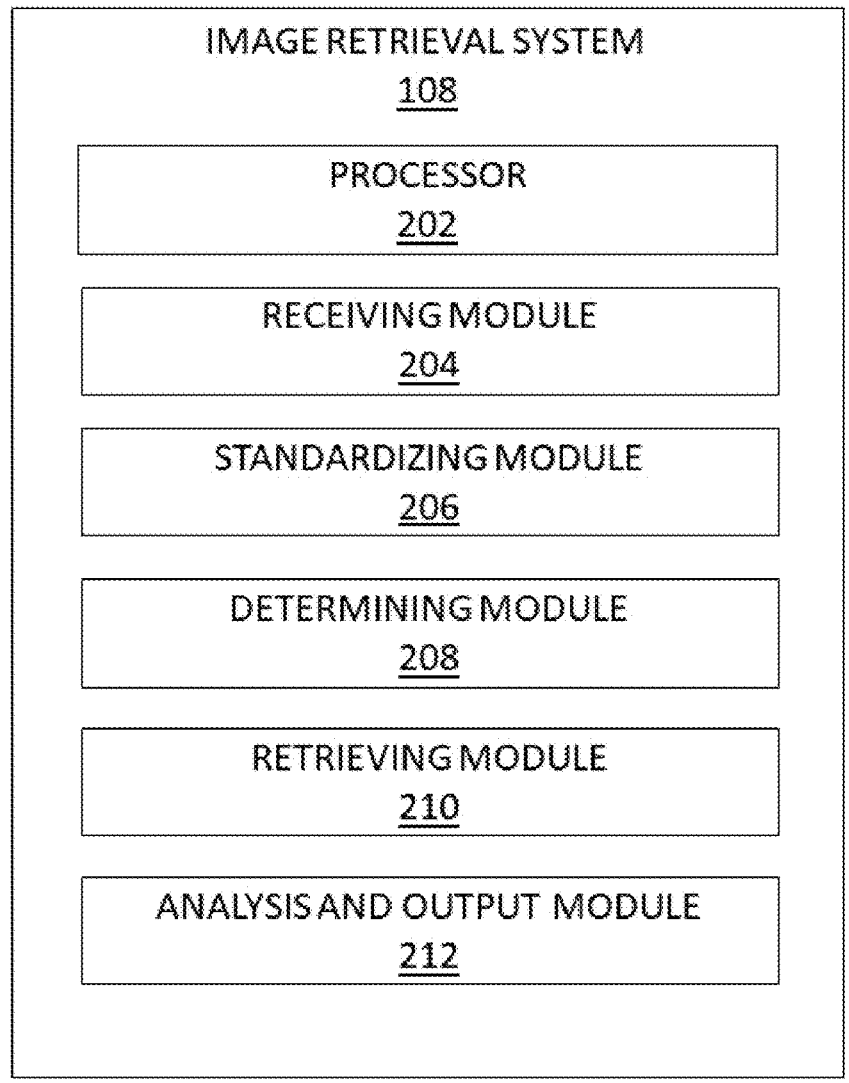
FIG. 2 illustrates a block diagram of an image retrieval system for content-based retrieval of images from a database according to an embodiment of the present disclosure.

FIG. 2 shows a block diagram of the exemplary image retrieval system 108 for content-based retrieval of the images from the database 102, according to an embodiment of the present disclosure. For the sake of brevity, features of the disclosure that are already explained in the description of FIG. 1 are not explained in detail in the description of FIG. 2.

The system 108 includes a processor 202, a receiving module 204, a standardizing module 206, a determining module 208, a retrieving module 210, and an analysis and output module 212. The processor 202, the receiving module 204, the standardizing module 206, the determining module 208, the retrieving module 210, and the analysis and output module 212 may be in communication with each other. Each of the components 202-212 may be implemented in a single computing device or multiple computing devices connected to each other via a communication bus using known or later developed technology.

The receiving module 204 may receive a plurality of images from the database 102. The images may be medical images or images of astronomical objects such as galaxies, nebulas, and clusters. The receiving module 204 may then disintegrate each of the plurality of images into a number of image patches of predefined pixel size. In one embodiment, an image may be disintegrated into a number of image patches of 32*32 pixels. The predefined size of the number of image patches may vary for different applications, based on requirement, for example, disease to be diagnosed or affected body part in the case of a medical image.

After disintegration, the standardizing module 206 may standardize the patches of the images along with corresponding diagnoses tags in order to remove unnecessary variation among the image patches. Such variations may include, but are not limited to, a rotational alignment, brightness, and contrast of the image patches. As would be gathered, the present disclosure discloses standardizing the patches by having rotation of the patches to be in a standard position to reduce irrelevant variation. The application of such standardization in the present application allows for higher scalability for future growth. Once standardization concept is developed in such application, small changes of scale do not affect the lookup. Further, a combination of rotation, scale, and average colour/brightness in combination of indexing of the images in the database 102 offers an accurate and comprehensive approach for the diagnostic purposes.

The determining module 208 may determine a core index of the images in the database for further application. In an embodiment, the determining module 208 determines a set of patches from the database 102 that appear close to each other with regard to appearance. For determining such sets of similar patches, the determining module 208 may compute the patch's standardized representation in a principal component basis (PCA) or other reduced dimension basis.

The determining module 208 may initially obtain a random sample of patches from few initial images, and then compare a patch with other patches in the database 102. In one embodiment, the determining module 208 may perform the comparison, based on absolute pixel space or values, and generate sets of patches in the database 102 that appear similar. The determining module 208 may determine the patches closer to each patch, based on other factors as well (for example as judged by the classification result of a trained "deep neural network"), without departing from the scope of the disclosure.

In one embodiment, a value of zero is allocated by the determining module 208 when two patches are found to be identical, based on the comparison. Further, the determining module 208 may store identical or similar patches together or through showing some nexus between the two, for example, Patch X closest to Patch Y. Therefore, the determining module 208 may compute the PCA based representation of the patches, and in turn form a training set of PCA components pairs. In one embodiment, the determining module 208 may quantize the representation of each patch in the reduced "PCA" space to form a covering of that space with addressable non-overlapping hyper-cubes (each cube having a unique address that identifies the quantized hyper-volume), This address is uniquely determined by the image patch content, and thus all patches that have the same address in this scheme will be (visually) similar to each other. After determining the close patches in the database 102, the determining module 208 may store each patch and associated 10-100 closest patches in form of groups in the database 102.

Thus, the entire space of patches is divided into hyper-cubes (cubes in high dimension) and each cube has a unique address. This address is shared by all patches in the hyper-cube—and so all patches with the same address are naturally "close". With suitable indexing, the database can retrieve all patches from a single hyper-cube at a specific address with constant-time cost (retrieval speed can be tuned to remain constant as more images are loaded). Thus, this technique allows scalable and accurate CBIR query performance.

In an embodiment of the present disclosure, the determining module 208 may store each patch in the database 102, in accordance with a key-value temporal data model 300 as illustrated in FIG. 3. According to the key-value temporal data model 300, the image patch content data is stored in a timeline store 302 and a data store 304. The data store 304 stores actual data bytes 306 of each image patch content data and fixed bit data references 308 corresponding to the stored data 306. In an example, a data reference is a hash code of data bytes generated using a hashing algorithm on corresponding data. Various examples of hashing algorithms include MD5, SHA-1, SHA-256, SHA-384 or a combination thereof.

The timeline store 302 stores various key values 310, various time values 309 indicating the time when corresponding key is mapped or assigned a data, and various data reference values 308 that point to the data bytes 306 assigned or mapped to corresponding keys 310. In an example, the key values 310 are identifying strings and are most commonly human readable. Further, a time value 309 is made up of the clock combined with a node ID encoded into the lowest bits as well as a sequence number optionally included in other (low order) bits. Thus, the timeline store 302 includes a time-ordered list of data entries i.e., (data reference, time) pairs that map "keys" to data (via its reference or address) at a specific time.

In operation, when a key is updated, a new entry is appended to corresponding timeline store 302 with a reference to the new data. The actual data is stored separately in the data store 304, which uses deduplication to preferentially return references for inclusion in the timeline store 302 that refer to data that has been stored previously (in a scalable and distributed manner). This means that multiple copies of data are not stored unnecessarily.

Thus, (key, data reference, time) tuple is unique as the system maintains time stream of all edits (can also be referred to as data history). The data model allows arbitrary ranges of keys and times to be specified in client queries, make it possible to perform consistent multi-key transactional updates, and further to perform range (in time and key space) based "Compare and Set" operations—e.g., a concurrent update to a number of keys e.g., (at a specific time—implicitly the transaction time) conditioned on there being no concurrent edits within a specified (key, time) range.

Referring back to FIG. 2, once the indexing of the images in the database 102 is performed in accordance with the temporal data model 300, then, in order to assess a target image, the system 108 may perform steps similar to processing of the images in the database 102 as explained earlier. The target image is also disintegrated into a plurality of standardized image patches. For each patch or spot in the target image, the retrieving module 210 may extract or retrieve a set of standardized image patches from the database 102. In one embodiment, a patch of the target image is mapped to one or more PCA components found to be "close" to a quantization boundary. In such an embodiment, the retrieving module 210 may retrieve patches that include these "near neighbouring" hyper-cubes. For example, the retrieving module 210 may return adjoining hyper-cubes to that of the target's address to ensure that all possible closest patches to target patch are included in further detailed analysis of pixel/patch similarity. Typically, the target image patches are not stored in accordance with a timeline key-value stored, as they don't have any labels associated with them yet. As soon as an expert has confirmed the labels, the image patches can be uploaded with the label and stored in accordance with the timeline key-value store.

The analysis and output module 212 may analyse the retrieved patches (from all hyper-cubes thus found) using a high-precision distance metric, based on pixels of the patches. The analysis and output module 212 may construct quantized address of the patch's hyper-cube as described above. Subsequently, the analysis and output module 212 may retrieve all patches that share the same (hyper-cube) address using a simple key (address)→value (list of patches) mechanism. The initial "distance" is measured as Euclidean distance in a reduced dimension of the PCA space. Based on this distance, hyper-cubes are addressed and patches similar to the target patches can be returned as the set of patches stored in this hyper-cube. However, the real distance is the full metric based on *all* the pixels in the patch, not just the position in a reduced PCA space. So, for greater accuracy the patches in the same PCA hyper-cube that have been returned by the initial query are then ordered by their distance from the target patch(es) as measured by a full pixel-based distance metric. This is a high-precision metric (e.g., the Euclidean distance using all the pixels as dimensions).

This is important as, even though all patches in a PCA hyper-cube are close to the target, the ultimate ordering should be based on full pixel similarity and not just a reduced PCA projection. The retrieved patches may then be ordered by this high precision metric and classified into a suitable category by using a machine learning technique. The machine learning technique may include, but is not limited to, random forest or deep neural networks.

A training set for the machine learning technique may be the database 102 of images that may be assessed to determine if there is anything novel or new in outcome of the images already in the database 102. The system 108 may repeatedly perform steps from projection into the PCA basis patches to the use of machine learning technique to identify images and generate a map of similar areas that then overlay the whole target image.

In an embodiment, the analysis and output module 212 may also generate a report including a pixel by pixel detail of the target image. The detail may include areas that contain the same label highlighted in a visible colour along with a detailed list of comparative images. The comparative images and labelled areas may be analysed using a classification system based on the above machine learning techniques including deep learning methods.

A client's key range search that is implemented efficiently in memory on storage nodes may assist a group of "near" patches to be found quickly. Adjustment of the quantization to provide efficient coverage of image space (e.g. at difference scales) may require reworking of indexes, but as only data references need to be repackaged (image patch data is referred by reference only) this is a relatively simple exercise.

It may be understood that in an embodiment of the present disclosure, the components 202-212 may be in the form of hardware components, while in another embodiment, the components 202-212 may be in the form of software entities/modules. In yet another embodiment of the present disclosure, the components may be a combination of hardware and software modules. The components 202-212 are configured to send data or receive data to/from each other by means of wired or wireless connections. In an embodiment of the disclosure, one or more of the units 202-212 may be remotely located.

The present disclosure utilizes the dimensional reduction method including PCA technique to cluster images together in a way that naturally groups similar images. For improving the accuracy, the present disclosure uses machine learning techniques. The system 108 proposes combination of the PCA basis computations with the machine learning technique that then allows the PCA coordinates to be subtly adjusted to get any patch into the best neighborhood. Further, PCA coordinates can be mapped to coded labels, which can be looked up quickly in a distributed storage system. The use of two or more schemes overlaying each other to further ensure closest patches are not missed when "hyper-cube" boxes are queried.

Using of the massive scalability of the system 108 to store numerous image/result pairs is aimed such that the output becomes predictable to high accuracy. In some cases, the accuracy may reach 100% with enough images. Therefore, the database 102 may become a record of precise performance for any system (automatic or otherwise) and can then be viewed as the primary record of any system's performance on a task. Further, deduplication may significantly reduce the storage cost, and thus a database approach to computing outputs of programs (by simple interpolation) becomes an equivalent record of the program. This would turn engineering practise on its head—where currently all effort is focussed on maintaining code and testing for reproducibility in code execution, this new approach would have the data set as the central record (not so important to maintain the code that assessed it for decades). Data is much easier to store for long periods and doesn't suffer from as much fragility as engineered code (as measured over decades).

Figure 4:
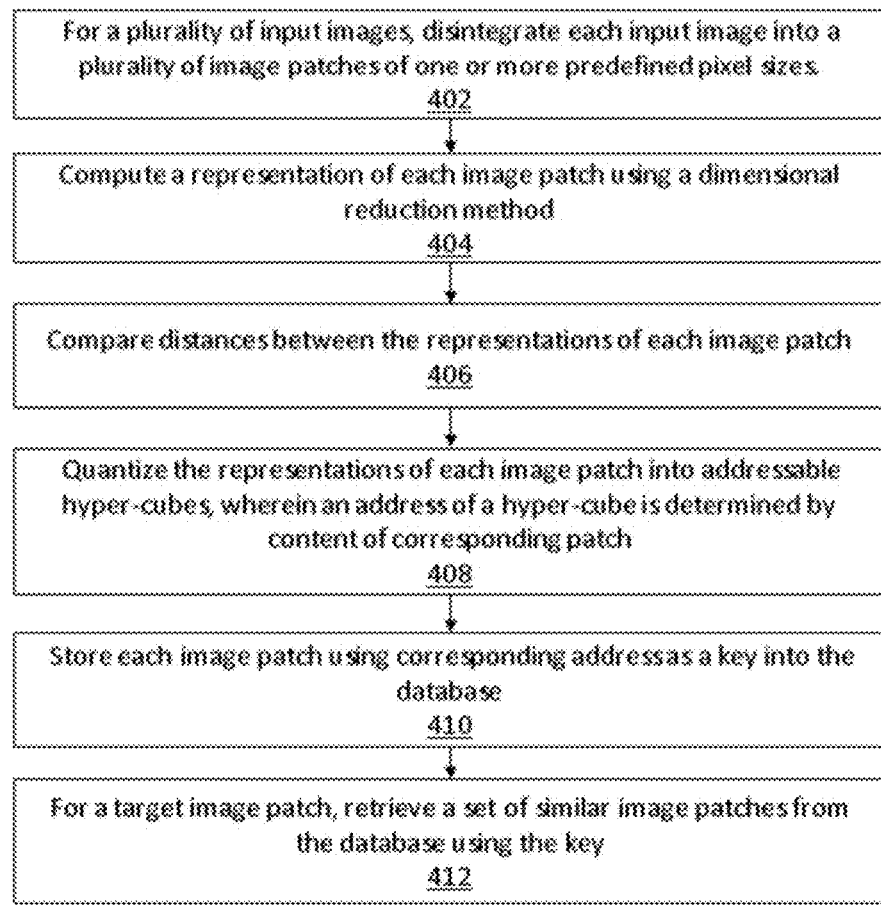
FIG. 4 illustrates a method flowchart for retrieval of similar images from a database, according to an embodiment of the present disclosure.

FIG. 4 illustrates a method flowchart 400 for retrieval of similar images from a database, according to an embodiment of the present disclosure.

At step 402, for a plurality of input images, each input image is disintegrated into a plurality of image patches of one or more predefined pixel sizes. After disintegration, each patch is standardized to remove variations of rotational alignment, brightness and contrast among the plurality of patches. In an example, an image patch is circular in shape.

At step 404, a representation of each image patch is computed using a dimensional reduction method. The dimension reduction is the process of reducing the number of variables under consideration by identifying a set of principal or major variables. Examples include, but are not limited to, principal component analysis (PCA), Non-negative matrix factorization (NMF), Kernel PCA, Graph-based Kernel PCA, Linear discriminant analysis (LDA), and Generalized discriminant analysis (GDA).

At step 406, distances between the representations of each image patch are compared. In an embodiment, the distances between the representations of each image patch are calculated using Euclidian measure. Alternatively, to improve accuracy, a random sample of patches are taken from an initial few images, and an exhaustive search is performed to find their closest neighbours in absolute pixel space/values. This is the gold-standard measure of similarity (a value of zero implies the patches are identical). These distances, together with their corresponding distances when measured in the reduced (e.g. PCA) dimensional representation then form a training set with which to train one of a range of ML models (for example Random Forest). This model can then be used on all input patches to "fine tune" their position in the reduced-dimensional space, thereby improving the accuracy of their placement in hyper-cubes and by implication assign their address (i.e. their "key" in the database store) better.

At step 408, the representations of each image patch are quantized into addressable hyper-cubes, wherein an address of a hyper-cube is determined by content of corresponding image patch, possibly adjusted using a trained NIL model.

In an example, the PCA components of image patches are quantized into hyper-cubes, and each PCA "box" is labelled with a letter A . . . Z (or more likely fewer letters to get coarser quantization). The quantization is adjusted (coarser or finer) to ensure that all the closest patches to all the target patches are within the same quantized box.

At step 410, each image patch is stored using corresponding address as a key into the database. In an example, a label (address) is created for hyper-cube of each image patch by concatenating the single letter labels for each corresponding quantised PCA component, for example, "ABBDFE-ABBCACCFDE".

In an embodiment, the database is a timeline database in accordance with a key-value temporal data model. According to the key-value temporal data model, the image patch content data is stored in a timeline store and a data store. The data store stores actual data bytes of each image patch content data and fixed bit data references corresponding to the stored data. The timeline store stores various key values, various time values indicating the time when corresponding key is mapped or assigned a data, and various data reference values that point to the data bytes assigned or mapped to corresponding keys. Thus, the timeline store includes a time-ordered list of data entries i.e., (data reference, time) pairs that map "keys" to data (via its reference or address) at a specific time.

Finally, at step 412, for a target image patch that is processed (into the reduced dimensional space and then optionally adjusted with the machine learning model) to obtain its address (key), a set of similar image patches are retrieved from the database using, using the address (key) and, optionally, neighboring addresses as keys.

The present disclosure may be implemented in the form of a computer programmable product for content-based image retrieval. The computer programmable product includes a set of instructions. The set of instructions when executed by a processor causes the processor to perform the methods as discussed with FIG. 4.

Figure 5:
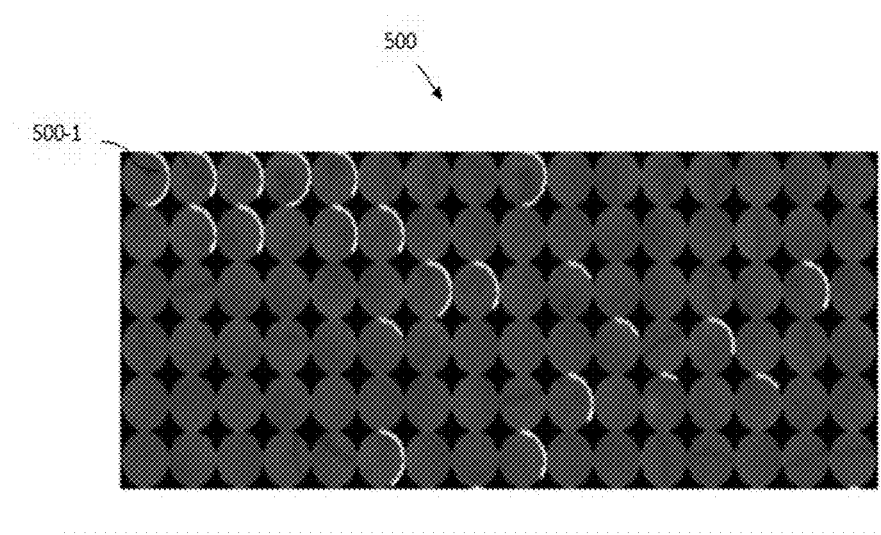
FIG. 5 illustrates exemplary image patches of retinas retrieved from the database that are found to be close to a patch in the exemplary target image, according to one embodiment of the present disclosure.

Example Implementation—Content Based Retrieval of Images Related to Medical & Astronomical Image Data FIG. 5 illustrates similar image patches 500 of retinas retrieved from the database 102 by the system 108, according to one embodiment of the present disclosure. In FIG. 5, top left patch 500-1 is the target patch, with the closest patches being listed in order from left to right and then top to down. Therefore, in the present embodiment, the closest patch, i.e., $2^{nd}$ from left in the top row, has a significant labelling of retinal disease as determined by medical experts.

Figure 6:
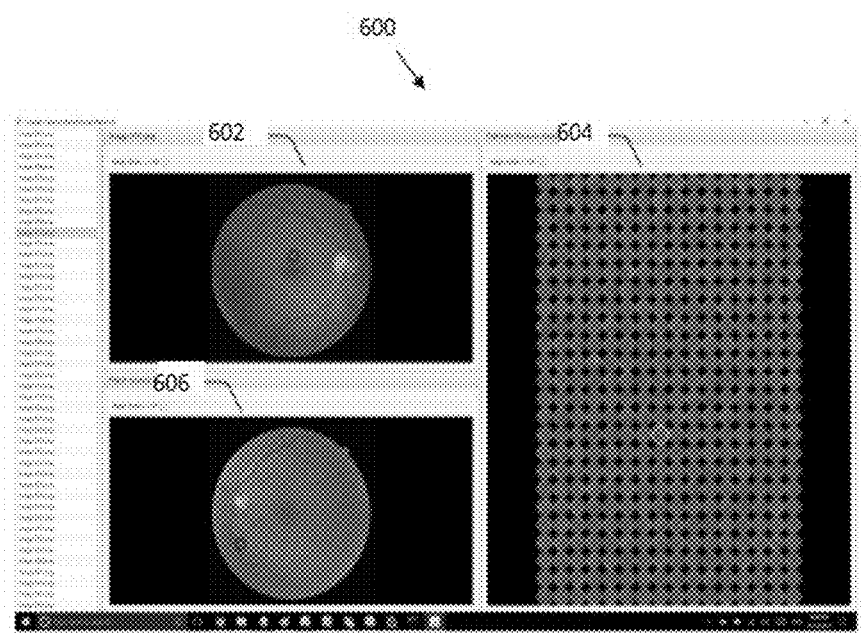
FIG. 6 illustrates an exemplary Graphical User Interface (GUI) to be shown to a user for medical diagnosis (retina image analysis as an example), according to one embodiment of the present disclosure.

FIG. 6 illustrates an exemplary Graphical User Interface (GUI) 600 to be shown to the user for the retina image analysis by the system 108, according to one embodiment of the present disclosure. The GUI 600 shows the target retina image 602, patches 604 close to one patch of the target image, and an image 606 from the database being from which that patch was extracted during the pre-processing/indexing phase.

Figure 7:
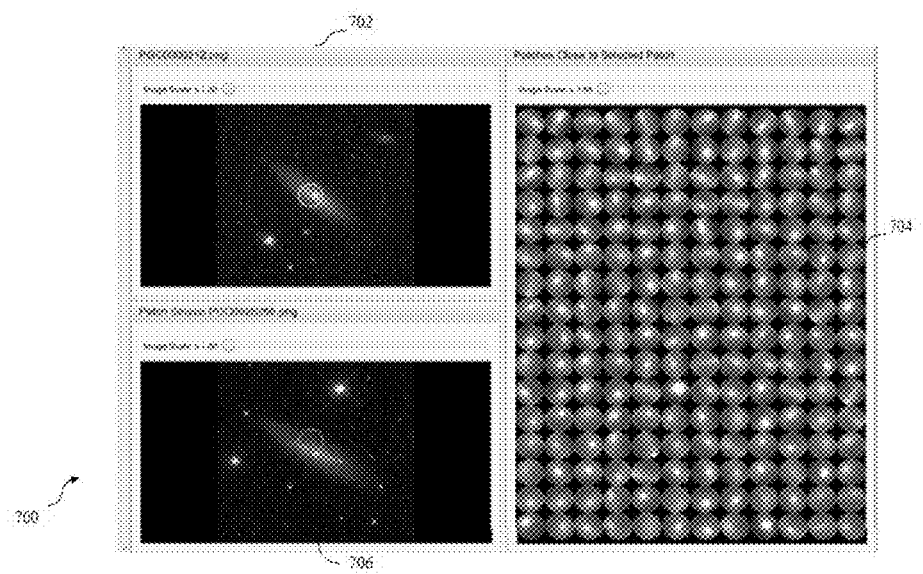
FIG. 7 illustrates an exemplary Graphical User Interface (GUI) to be shown to a user for astronomical objects identification (galaxy image analysis as an example), according to one embodiment of the present disclosure.

FIG. 7 illustrates an exemplary Graphical User Interface (GUI) 700 to be shown to the user for the galaxy image analysis by the system 108, according to one embodiment of the present disclosure. The GUI 700 shows the target galaxy image 702, patches 704 close to one patch of the target image, and an image 706 from the database from which that patch was extracted during the pre-processing/indexing phase.

The present disclosure may be implemented in a regular client-server configuration; however, other configurations may also be implemented. The image retrieval system 108 as described in the present disclosure or any of its components, may be embodied in the form of a computer system. Typical examples of a computer system include a general-purpose computer, a programmed microprocessor, a micro-controller, a peripheral integrated circuit element, and other devices or arrangements of devices that are capable of implementing the method 400 of the present disclosure.

The computer system comprises a computer, an input device, a display unit and the Internet. The computer further comprises a microprocessor. The microprocessor is connected to a communication bus. The computer also includes a memory. The memory may include Random Access Memory (RAM) and Read Only Memory (ROM). The computer system further comprises a storage device. The storage device can be a hard disk drive or a removable storage drive such as a floppy disk drive, optical disk drive, etc. The storage device can also be other similar means for loading computer programs or other instructions into the computer system. The computer system also includes a communication unit. The communication unit communication unit allows the computer to connect to other databases and the Internet through an I/O interface. The communication unit allows the transfer as well as reception of data from other databases. The communication unit may include a modem, an Ethernet card, or any similar device which enables the computer system to connect to databases and networks such as LAN, MAN, WAN and the Internet. The computer system facilitates inputs from a user through input device, accessible to the system through I/O interface.

The computer system executes a set of instructions that are stored in one or more storage elements, in order to process input data. The storage elements may also hold data or other information as desired. The storage element may be in the form of an information source or a physical memory element present in the processing machine.

The set of instructions may include one or more commands that instruct the processing machine to perform specific tasks that constitute the method of the present disclosure. The set of instructions may be in the form of a software program. Further, the software may be in the form of a collection of separate programs, a program module with a larger program or a portion of a program module, as in the present disclosure. The software may also include modular programming in the form of object-oriented programming. The processing of input data by the processing machine may be in response to user commands, results of previous processing or a request made by another processing machine.

For a person skilled in the art, it is understood that these are exemplary case scenarios and exemplary snapshots discussed for understanding purposes; however, many variations to these can be implemented in order to detect objects (primarily human bodies) in video/image frames.

In the drawings and specification, there have been disclosed exemplary embodiments of the present disclosure. Although specific terms are employed, they are used in a generic and descriptive sense only and not for purposes of limitation, the scope of the present disclosure being defined by the following claims. Those skilled in the art will recognize that the present disclosure admits of a number of modifications, within the spirit and scope of the inventive concepts, and that it may be applied in numerous applications, only some of which have been described herein. It is intended by the following claims to claim all such modifications and variations which fall within the true scope of the present disclosure.

What is claimed is:

1. A method for retrieval of similar images from a database, the method comprising:
    for a plurality of input images, disintegrating each input image into a plurality of image patches of one or more predefined pixel sizes;
    computing a representation of each image patch using a dimensional reduction method;
    comparing distances between the representations of each image patch;
    quantizing the representations of each image patch into addressable hyper-cubes, wherein an address of a hyper-cube is determined by content of corresponding image patch;
    storing each image patch using corresponding address as a key into the database; and
    for a target image patch, retrieving a set of similar image patches from the database using the key.

2. The method of claim 1 further comprising standardizing each image patch to remove variations of rotational alignment, brightness and contrast among the plurality of image patches.

3. The method of claim 1, wherein the dimensional reduction method is principal component analysis (PCA).

4. The method of claim 1, wherein the distances between the representations of each image patch are calculated using the Euclidian measure.

5. The method of claim 1 further comprising quantizing the representations of each image patch into addressable hyper-cubes using a machine learning technique.

6. The method of claim 1, wherein the database is a timeline database in accordance with a key-value temporal data model.

7. The method of claim 1 further comprising analyzing the retrieved set of image patches using a high-precision distance metric based on pixels of the image patches.

8. A system for retrieval of similar images from a database, the system comprising:
    a processor and a memory;
    a receiving module configured to disintegrate each input image into a plurality of image patches of one or more predefined pixel sizes;
    for a plurality of input images, a determining module configured to:
        compute a representation of each image patch using a dimensional reduction method;
        compare distances between the representations of each image patch;
        quantize the representations of each image patch into addressable hyper-cubes, wherein an address of a hyper-cube is determined by content of corresponding image patch; and
        store each image patch using corresponding address as a key into the database; and
    a retrieving module configured to retrieve a set of similar image patches from the database for a target image patch using the key.

9. The system of claim 8 further comprising a standardizing module configured to standardize each image patch to remove variations of rotational alignment, brightness and contrast among the plurality of patches.

10. The system of claim 8, wherein the dimensional reduction method is principal component analysis (PCA).

11. The system of claim 8, wherein the distances between the representations of each image patch are calculated using the Euclidian measure.

12. The system of claim 8, wherein the determining module is further configured to quantize the representations of each image patch into addressable hyper-cubes using a machine learning technique.

13. The system of claim 8, wherein the database is a timeline database in accordance with a key-value temporal data model.

14. The system of claim 8 wherein the analysis & output module is further configured to analyze the retrieved set of image patches using a high-precision distance metric based on pixels of the image patches.

15. A non-transitory computer readable medium for storing data in a database, the non-transitory computer readable medium comprising a set of instructions, the set of instructions when executed by a processor causes the processor to:
    for a plurality of input images, disintegrate each input image into a plurality of image patches of one or more predefined pixel sizes;
    compute a representation of each image patch using a dimensional reduction method;
    compare distances between the representations of each image patch;

quantize the representations of each image patch into addressable hyper-cubes, wherein an address of a hyper-cube is determined by content of corresponding image patch;

store each image patch using corresponding address as a key into the database; and for a target image patch, retrieve a set of similar image patches from the database using the key.

16. The non-transitory computer readable medium of claim 15, wherein the set of instructions when executed by a processor further causes the processor to standardize each image patch to remove variations of rotational alignment, brightness and contrast among the plurality of patches.

17. The non-transitory computer readable medium of claim 15, wherein the dimensional reduction method is principal component analysis (PCA).

18. The non-transitory computer readable medium of claim 15, wherein the distances between the representations of each image patch are calculated using the Euclidian measure.

19. The non-transitory computer readable medium of claim 15, wherein the set of instructions when executed by a processor further causes the processor to quantize the representations of each image patch into addressable hyper-cubes using a machine learning technique.

20. The non-transitory computer readable medium of claim 15, wherein the database is a timeline database in accordance with a key-value temporal data model.

21. The non-transitory computer readable medium of claim 15, wherein the set of instructions when executed by a processor further causes the processor to analyze the retrieved set of image patches using a high-precision distance metric based on pixels of the image patches.

* * * * *